June 16, 1964     R. GORCEY     3,137,405
PRESSURE VESSEL

Filed Dec. 18, 1961     2 Sheets-Sheet 1

INVENTOR.
RICHARD GORCEY

BY

*Lowell A. Turner*

AGENT

June 16, 1964     R. GORCEY     3,137,405
PRESSURE VESSEL

Filed Dec. 18, 1961     2 Sheets-Sheet 2

INVENTOR.
RICHARD GORCEY

BY

AGENT

United States Patent Office 3,137,405
Patented June 16, 1964

3,137,405
PRESSURE VESSEL
Richard Gorcey, Encino, Calif., assignor to
North American Aviation, Inc.
Filed Dec. 18, 1961, Ser. No. 160,132
7 Claims. (Cl. 220—3)

This invention relates to an improved pressure vessel, particularly as related to vessels for storage of corrosive fluids under pressurized conditions.

Pressure vessels of this nature in the prior art have generally been heavy resultant from the necessity of fabricating same from materials (usually metals) compatible with the fluid to be stored and from the necessity for providing thick walls to accommodate the required high pressures. While such vessel weights can usually be tolerated in fixed ground storage applications, certain other applications, for example, movable fluid storage pressure vessels, require light weight structures. The vessels of the present invention are particularly adaptable in filling this requirement.

The present invention is particularly adaptable to the storage of fluids which must necessarily be maintained under high pressure conditions and which are incompatible with plastics and/or elastomers and cannot, therefore, be brought into direct contact therewith. Normally, this problem would be met by the simple expedient of using a metal vessel of sufficient thickness to withstand the storage pressures. Nevertheless, because of weight considerations, heavy metal tanks cannot be used in numerous applications. Therefore, a lightweight metallic liner compatible with the storable fluid and utilized with the high strength characteristics of an outer shell element such as can be fabricated by a filament wound construction is the apparent solution. Such a configuration, however, presents a basic problem. The modulus of the elasticity of filament-wound, fiberglass-reinforced plastic is usually about one-half that of aluminum, the most preferred metal for such a tank liner. Additionally, the strain resistance of the aluminum is only approximately one-fifth that of the composite fiberglass structure making up the pressure shell. Since the geometry of the tank construction imposes equal strain on the aluminum liner and the fiberglass as the tank is pressurized, the liner becomes loaded to its elastic limit long before the fiberglass has been loaded to such a sufficient level to exhibit benefits in weight-saving capability. Consequently, the liner becomes stretched far beyond its elastic limit during the pressurization phase. When the vessel is depressurized the liner is forced back to its original shape. After a series of such pressure cycles, the metal liner experiences a condition which is known as super fatigue. This eventually results in cracking of the liner and failure of the pressure vessel. By means of the floating liner configuration of the present invention the pressure internally and externally of the liner is at all times substantially equal. A fatigue condition is thereby prevented.

It is an object of the invention to provide a light weight pressure vessel capable of storing high pressure fluids.

Another object of invention is to provide a light weight vessel compatible with corrosive fluids.

Yet another object is to provide a high pressure vessel including means for preventing fatigue of a light weight metallic liner.

Still another object is to provide a pressure vessel including floating liner across which a pressure differential is substantially negated.

Other objects of invention will become apparent from the following description taken in connection with the accompanying drawings, in which.

Figure 1:
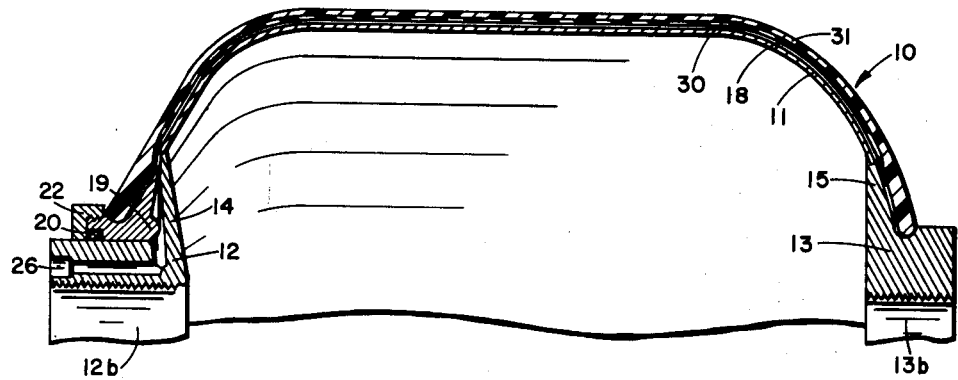
FIG. 1 is a sectional view partially cutaway and illustrating a typical vessel configuration.
Figure 2:
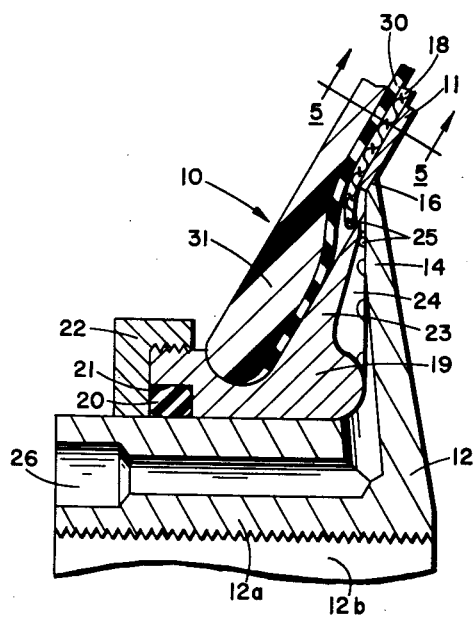
FIG. 2 is an enlarged sectional view of the inlet end of the vessel.

The invention in its basic form comprises a "floating" liner of minimum thickness and weight surrounded in spaced relation by a high strength shell. At least one end member or combination of bosses is fixed to the liner and shell portions such that the fluid to be stored and a pressurizing fluid are introduced substantially simultaneously to the liner interior and to the space between the liner and the high pressure shell such that the pressure differential across the tank liner is substantially zero at all times. A gas impervious bladder is usually disposed over the liner and sealed to the boss in a manner facilitating introduction of the pressurizing fluid between the liner and the bladder.

FIGS. 1–4 illustrate a tank or vessel 10 having a relatively thin-walled tank or liner 11. Liner 11 is typically made from aluminum or a similar light weight metal compatible with the fluid to be stored internally thereof. At appropriate locations the liner is perforated and at least one boss is provided through the perforation for inlet and outlet of the fluid to be stored. Bosses 12 and 13 are for this purpose. Boss 12 includes a neck portion 12a having a central passage 12b and a peripheral flange 14. Boss 13 includes a neck portion 13a having a central passage 13b and a peripheral flange 15. The boss-to-liner connection may be made in any conventional manner. An acceptable means of attachment is to provide flanges 14 and 15 with their peripheral regions 16 and 17 (FIGS. 2 and 3) shaped to match the liner contour. The liner and bosses are then brazed, welded, or otherwise conventionally joined in a pressure sealed manner to regions 16 and 17.

Figure 3:
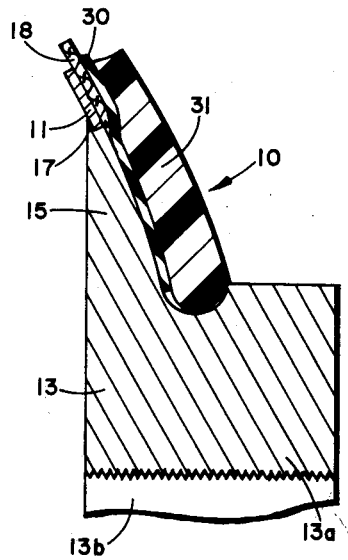
FIG. 3 is an enlarged sectional view of the opposite end of the vessel.
Figure 4:
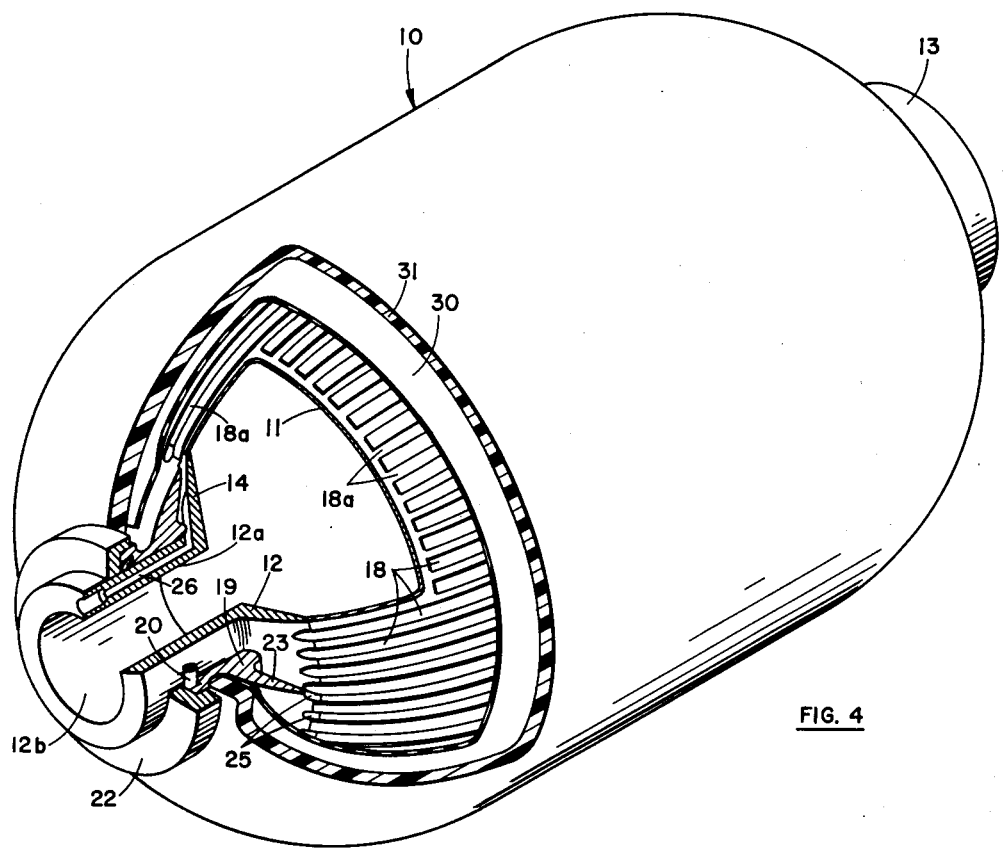
FIG. 4 is a perspective partially cutaway to better illustrate the vessel construction.

Immediately surrounding liner 11, a passage means or bleeder means is provided whereby the outer tank portions are maintained in a controlled spacial relation with respect to the liner. This is usually accomplished through the provision of spacer elements. In this regard such spacer elements have been successfully provided by placing a plurality of relatively open weave cloth strips or tapes 18 overlapping boss flange 14 and extending over the surface of the tank liner to overlap boss flange 15. Cotton cloth strips have been found to be acceptable for this purpose since pressurizing gas bleeds through them quite readily. However, regardless of the specific strip material utilized it is considered to be within the scope of this invention so long as the particular means whereby the spacial relation is maintained facilitates flow of pressurizing fluid about the tank liner. For example, wires, glass filaments or other spacer means may be provided. The typically preferred manner of affixing cloth strips is illustrated in FIG. 4. Strips 18 are disposed substantially parallel to one another longitudinally over the periphery of tank liner 11 beginning at boss flange 14. They terminate at boss flange 15, as seen in FIGS. 1 and 3. Where a single boss only is utilized or where it is otherwise desirable resultant from the tank shape the strips are tapered in width, or alternate ones of the strips are terminated at appropriate locations to prevent overlapping of the strips and/or to better facilitate passage of pressurizing gases through passages 18a defined between the strips. It should be understood that passages 18a need not be provided in the event that the material of strips 18 is adequately porous to facilitate fluid flow therethrough.

Concentrically surrounding boss 12 is a floating secondary boss 19 pressure sealed with respect to boss 12 by a conventional O ring 20 or a similar seal means, the "floating" feature resulting from the ability of boss 19 to move axially over neck 12a during operation. O ring 20 is retained in an annular groove 21 by nut 22 threadedly secured over floating boss 19. Floating boss 19 is provided with a flange 23 (FIG. 2), the periphery of which in the usual instance contacts flange 14 near its outer extremity. An annular manifold region 24 intermediate of the flanges is thus defined. A series of slots 25 are provided in the tip periphery of flange 23 in order that fluid may freely flow therethrough into and out of the passages or bleeder means along the surface of liner 11.

Boss 12 is also provided with a passage 26 communicating between the exterior of the boss and annular manifold region 24 for introducing pressurizing fluid into and facilitating its exit from the manifold region.

Disposed about cloth strips 18 and over liner 11 is an impervious elastomeric pressure seal or bladder 30, sometimes referred to as a membrane, which extends into intimate contact and is sealed to the external surfaces of boss flanges 15 and 23 by conventional bonding agents. It is a requirement of bladder 30 that it be non-porous in order that it may contain pressures without substantial leakage therethrough. A 0.010-inch thick rubber bladder made by dip molding a latex suspension is an example of an acceptable bladder.

Intimately disposed over the external surface of bladder 30 is a high strength, low weight pressure shell 31. This shell may be fabricated by wrapping fiberglass filaments impregnated with a bonding resin helically and/or circumferentially about the liner in a conventional manner. It is preferred that a first filament layer be wrapped helically in order that pressures are distributed substantially equally about the entire periphery of the liner and in order to assure maximum strength and bonding integrity over the boss flanges. However, any winding pattern capable of application to provide a high strength shell of the nature described may be utilized. When the wrapping procedure is completed the resin is cured in a conventional manner, a hard integral glass-reinforced plastic pressure shell having high strength characteristics resulting.

Since liner 11 is of relatively light weight material and the fiberglass of shell 31 is wrapped under tension in accordance with standard techniques, means is provided whereby liner 11 will not be collapsed during the fabrication. This can be accomplished by filling the liner interior with a solid meltable or otherwise removable material, by pressurizing the liner interior with air, or by filling the liner with water or other non-compressible fluid. The water filling method has been found to be particularly acceptable. In such procedure the completed tank assembly, minus the pressure shell, is filled with water and the air between the liner and the bladder is removed as completely as possible. As glass filaments are wound over the bladder their tension compresses the liner a slight amount. This liner deflection generates a hydraulic pressure in the water which acts upon the balance of the liner and causes it to act as a nearly rigid body, care being exercised to assure that self-generated pressure does not cause the liner to be loaded beyond its elastic limit. Filament winding then continues until the required thickness is obtained. Before curing the resin it is generally desirable to displace the water by air at a predetermined pressure in order to reduce the warm-up time required for the curing procedure.

Figure 5:
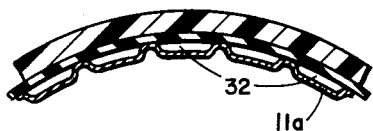
FIG. 5 is a section of an alternate configuration taken only representatively along line 5—5 of FIG. 2.

An alternative embodiment of the invention is representatively illustrated in FIG. 5. The surface of the liner 11a is provided with a series of corrugations which extend longitudinally of the tank or in other patterns such that pressure introduced from a manifold such as 24 (FIG. 2) is transferred into passages 32 and distributed over the entire surface of the liner. Use of such corrugations eliminates the necessity for using cloth strips, etc. as the bleeder means by providing independent passage means.

In operation, fluid inlet and outlet lines with suitable valve (not shown) are connected to boss passages 12b and 13b. A pressure line (not shown) is also connected to passage 26 leading from a suitably pressurized inert gas source. The gas is introduced through passage 26 into annular manifold 24 and through slots 25 into the spacial region intermediate of liner 11 and bladder 30. The introduction of the inert pressurizing gas into this region is accomplished substantially simultaneous with the entrance of the storable fluid internally of liner 11, the pressures internally and externally of liner 11 being maintained in substantial equality as the tank filling procedure progresses. Hence, at any stage during the filling procedure or when the tank is filled to its final pressure and capacity there is substantially no pressure differential acting across liner 11. The full pressure is applied to shell 31 through bladder 30. The contained fluid may be stored in this condition for extended periods of time without detriment to the tank, periods in the order of five or more years being contemplated.

When the stored fluid is removed from tank 10 the pressure maintained between liner 11 and bladder 30 is reduced simultaneously with that of the stored fluid until such time as both pressures reach zero. Through utilization of the described features of this invention each of the objects is met and a vessel capable of withstanding numerous operational cycles is obtained.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A pressure vessel comprising
    a flexible impervious thin-walled liner compatible with fluid to be contained therein,
    an impervious elastomeric bladder substantially pressure seal enclosing said liner and permitting flow of pressurized fluid therebetween,
    a high-strength rigid shell entirely surrounding said bladder seal, and structural means affixed to said liner and said shell including
        passage means communicating with the interior and separate passage means communicating with the exterior of said liner for simultaneous pressurization internally and externally thereof, whereby said vessel is enabled to be subjected to high internal pressures without substantial pressure differential across said liner.

2. The pressure vessel of claim 1 wherein said liner is a light weight metal and said shell is a filament-wound, glass-reinforced plastic.

3. The pressure vessel of claim 1 including a plurality of longitudinally extending cloth strips between said seal and liner for insuring said flow.

4. The pressure vessel of claim 1 including a series of corrugations in said liner, said corrugations being oriented to facilitate passages of fluid over substantially all increments of an external surface of said liner.

5. A pressure vessel comprising
    a light weight metal liner having a perforation therein, said liner being compatible with fluid to be contained therein,
    an impervious elastomeric bladder disposed over said liner and sealed adjacent said perforation,
    a high strength shell of filament-wound, glass-reinforced plastic surrounding said liner, pressure bleeder means disposed between said liner and said bladder to space same from each other and to facilitate passage of fluid over substantially all increments of an external surface of said liner, and means affixed to said liner and said shell adjacent said liner perforation and including
- passage means communicating between the exterior of said vessel and the interior of said liner, and
- passage means communicating between the exterior of said vessel and said bleeder means.

6. A fluid container comprising
a perforated tank,
a first boss affixed through said tank,
- said boss including a neck portion, and
- a flange peripherally extending from said neck portion, and sealably fixed to said tank at said perforation,
a second boss positioned concentrically about said neck portion of said first boss and axially and sealably movable thereover,
said second boss including a peripheral flange extending adjacent said first-mentioned flange;
means defining a peripheral passage between said flanges,
an elastomeric bladder sealably attached to said flange of said second boss and extending over said tank,
fluid bleeder means disposed between said tank and said bladder in communication with said peripheral passage,
passage means in said first boss separately communicating with said peripheral passage and the interior of said tank from an external region of said first boss, and
a high strength shell disposed over said bladder.

7. A pressure vessel boss combination comprising a centrally perforated first boss,
a peripheral flange integrally extending from said boss and adapted for attachment to a vessel liner,
a second boss surrounding and axially movable over said first boss,
a peripheral flange integrally extending from said second boss, said last-mentioned flange adapted to have a pressure seal and pressure shell affixed to an external surface thereof,
passage means defined between the peripheries of said flanges,
said first boss including a passage leading from an external region thereof to said passage means.

References Cited in the file of this patent

UNITED STATES PATENTS

| 1,911,608 | Davis et al. | May 30, 1933 |
| 2,503,339 | Jandus | Apr. 11, 1950 |
| 2,507,778 | Frey | May 16, 1950 |
| 2,762,736 | Beuglet | Sept. 11, 1956 |
| 2,772,860 | Nelson | Dec. 4, 1956 |
| 2,916,182 | Rollins et al. | Dec. 8, 1959 |
| 2,995,011 | Kimmel | Aug. 8, 1961 |

FOREIGN PATENTS

| 184,870 | Switzerland | Sept. 1, 1936 |